United States Patent
Kobayashi et al.

(10) Patent No.: US 6,323,308 B1
(45) Date of Patent: Nov. 27, 2001

(54) ALIPHATIC POLYESTER FILM

(75) Inventors: Hisato Kobayashi, Ohtsu; Naonobu Oda, Tsuruga; Keiji Mori, Ohtsu; Tadashi Okudaira, Ohtsu; Katsufumi Kumano, Ohtsu; Shigeto Yoshida, Ohtsu, all of (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/534,497

(22) Filed: Mar. 24, 2000

(30) Foreign Application Priority Data

Mar. 26, 1999 (JP) .................................................. 11-083374
Mar. 29, 1999 (JP) .................................................. 11-087018

(51) Int. Cl.$^7$ ...................................................... B32B 27/36
(52) U.S. Cl. ........................... 528/354; 528/271; 528/359; 528/361; 428/480; 428/910
(58) Field of Search ..................................... 428/480, 910; 528/271, 354, 359, 361, 272, 300, 307

(56) References Cited

U.S. PATENT DOCUMENTS 5,763,513 * 6/1998 Suzuki et al. ........................ 524/230
5,853,639 * 12/1998 Kawakami et al. ............ 264/177.19
6,136,905 * 10/2000 Suzuki et al. ........................ 524/310

FOREIGN PATENT DOCUMENTS

| 55-8551 | 3/1980 | (JP) . |
| 56-50692 | 12/1981 | (JP) . |
| 07-179626 * | 7/1995 | (JP) . |
| 7-207041 | 8/1995 | (JP) . |

* cited by examiner

Primary Examiner—Vivian Chen
(74) Attorney, Agent, or Firm—Morrison & Foerster LLP

(57) ABSTRACT

An aliphatic polyester film comprising, as a main component, a polylactic acid having a reduced viscosity ($\eta sp/C$) of not less than 0.50 dl/g and not more than 2.50 dl/g, wherein the film has a thermal shrinkage in the longitudinal direction at 120° C. of not more than 5.0% is provided. The aliphatic polyester film of the present invention is provided which is useful as a packaging film and an adhesive tape, superior in hand tearability, twist retention, processability and film forming property, and which is biodegradable when placed in a natural environment.

16 Claims, No Drawings

ALIPHATIC POLYESTER FILM

TECHNICAL FIELD OF THE INVENTION

The present invention relates to an aliphatic polyester film. More particularly, the present invention relates to an aliphatic polyester film which is useful as a packaging film and a tape for fresh food, processed food, pharmaceutical products, medical equipment, electronic parts and the like, and which has superior properties in the above use, such as hand tearability, twist retention, processability and film forming property.

BACKGROUND OF THE INVENTION

Films made from aliphatic polyester, inclusive of polylactic acid, have been developed to acquire natural decomposability upon disposal in a natural environment. For example, a polylactic acid film is naturally hydrolyzed in soil and decomposed into harmless substances with the aid of microorganisms.

On the contrary, the preferential aim of acquiring natural decomposability has prevented sufficient expression of the superior properties that aliphatic polyester inherently has. To be specific, advanced orientation and crystallization of the film inhibits hydrolysis and decomposition by microorganisms. To suppress orientation and crystallization of the film, therefore, strength and thermal dimensional stability have been sacrificed to a certain degree.

In the meantime, attempts have been made to improve degree of orientation and crystallinity of the film, thereby to increase strength and thermal dimensional stability. For example, JP-A-7-207041 discloses polylactic acid made from a polylactic acid polymer, which has a plane orientation $\Delta P$ of not less than $3.0 \times 10^{-3}$, and which shows a difference value ($\Delta Hm - \Delta Hc$) between the amount of crystallization melting heat $\Delta Hm$ upon elevation of the temperature of the film, and the amount of crystallization heat $\Delta Hc$ generated by crystallization during temperature elevation of not less than 20 J/g.

This polylactic acid film does not aim at improving hand tearability, twist retention and post-processing stability, such as printability, required of a packaging film. Moreover, the polylactic acid polymer film exemplified therein has insufficient properties, particularly post-processing stability, such as dimensional resistance at 120° C. necessary for printing, laminating and the like, such that this film is insufficient to achieve the above-mentioned goal. In the prior art technique relating to other aliphatic polyester films, no attention has been paid to the reduction of viscosity or properties of polylactic acid polymer even when attempting to improve hand tearability, twist retention and post-processing stability, such as printability, of a packaging film.

Conventionally, polyethylene terephthalate oriented films have been used for packaging bags, adhesive tapes and the like because of the superior properties they have in toughness, heat resistance, water resistance, transparency and the like. In general terms, a packaging film for fresh food, processed food, pharmaceutical products, medical equipment, electronic parts and the like should permit easy tearing with hand, i.e. "hand tearability", and also should be able to stay twisted upon twisting, i.e. "twist retention".

Polyethylene terephthalate oriented films have the above-mentioned superior properties but they are poor in hand tearability. As a result, the film causes difficulty in tear opening a packaging bag or cutting an adhesive tape. Further, the film is defective in that it cannot be used for twist packaging due to its poor twist retention.

A film having superior hand tearability is cellophane. It is superior not only in hand tearability but also in properties such as transparency, twist retention and the like, and is very useful for various packaging materials and adhesive tapes. However, cellophane shows moisture-adsorption characteristic, which prevents provision of constant quality of the film due to seasonal variations in these properties.

As a film that satisfies hand tearability and twist retention, for example, a uniaxially oriented polyester film (JP-B-55-8551) and a polyethylene terephthalate film (JP-B-56-50692) obtained by copolymerization of diethylene glycol component and the like, have been proposed.

The above-mentioned uniaxially oriented polyester film permits linear splitting in the orientation direction but otherwise in other directions. The polyethylene terephthalate film obtained by copolymerization of diethylene glycol component and the like does not show properties which polyethylene terephthalate inherently has. This film is also unsatisfactory in terms of hand tearability and twist retention.

SUMMARY OF THE INVENTION

The present invention solves the above-mentioned problems and provides an aliphatic polyester film, which is useful as a packaging film and a tape, degradable when disposed in a natural environment, superior in hand tearability and twist retention, and superior in processability and film forming property as evidenced by the following aspects:

(a) the film hardly suffers from printing misalignment, wrinkling and the like during film processing such as printing, laminating and the like when producing a packaging film, a tape and the like, and (b) the film hardly suffers from snaking during running.

According to the present invention, the above object has been achieved by using an aliphatic polyester having a specific repeating unit and a reduced viscosity ($\eta$sp/C) in a specific range. The use of such polyester results in improved hand tearability, twist retention, processability and film forming property. By setting the thermal shrinkage and thickness unevenness to a given range, a packaging film more superior in the above-mentioned properties can be obtained.

Accordingly, the present invention provides an aliphatic polyester film made from an aliphatic polyester having a primary repeating unit of the following formula

wherein R is hydrogen or alkyl having 1 to 3 carbon atoms, and a reduced viscosity ($\eta$sp/C) of not less than 0.50 dl/g and not more than 2.50 dl/g, wherein the film has a thermal shrinkage in the longitudinal direction at 120° C. of not more than 5.0%.

In one embodiment of the present invention, the film has a thickness unevenness in the longitudinal direction of not more than 10.0%.

In another embodiment of the present invention, the film has a thickness unevenness in the width direction of not more than 10.0%.

In yet another embodiment of the present invention, the film has a thermal shrinkage in the width direction at 120° C. of not more than 5.0%.

In one embodiment of the present invention, the film has a refractive index (Nz) in the thickness direction of not less than 1.4400 and not more than 1.4550.

In one embodiment of the present invention, the film shows a difference value (Nx–Ny) between the refractive index (Nx) in the longitudinal direction and the refractive index (Ny) in the width direction of not less than –0.0200 and not more than 0.0000.

In one embodiment of the present invention, the aliphatic polyester is a polylactic acid.

In one embodiment of the present invention, the film is a biaxially oriented film.

DETAILED DESCRIPTION OF THE INVENTION

As used in the present specification, by "primary" and "main" are meant that other copolymers and other resin components may be mixed to the extent that the effect of the present invention is not impaired.

The aliphatic polyester in the present invention has a primary repeating unit of the formula

wherein R is hydrogen or alkyl having 1 to 3 carbon atoms. The alkyl groups having not less than 4 carbon atoms have been excluded because heat stability during melt extrusion, orientation and crystallizability of the film are degraded. In the above-mentioned formula, the alkyl having 1 to 3 carbon atoms may be, for example, methyl, ethyl, n-propyl, isopropyl and the like.

The above-mentioned aliphatic polyester preferably contains the above-mentioned repeating unit in a proportion of not less than 90 mol %, more preferably not less than 95 mol %. Other units that may be contained besides the above-mentioned repeating unit may be, for example, aliphatic polyester unit having a formula different from the above-mentioned formula, which is derived from hydroxycarboxylic acid and/or aliphatic polyester unit obtained from diol and dicarboxylic acid.

Examples of the above-mentioned aliphatic polyester include residues of polylactic acid, polyglycollic acid, poly(2-hydroxybutyric acid) and the like. When the polyester has an asymmetric carbon, it may be L-isomer, DL-isomer or D-isomer. In the present invention, polylactic acid is preferable from the aspects of heat resistance and the cost of starting materials.

The above-mentioned aliphatic polyester can be produced by a known method comprising subjecting an anhydrous cyclic ester compound derived from a-oxy acid to ring-opening polymerization and the like.

The film of the present invention contains the above-mentioned aliphatic polyester as a main component. As long as the object of the present invention can be achieved, other resins may be also contained in an amount of not more than 20 wt %. Examples thereof include resins such as polypropylene, polystyrene and the like.

According to the present invention, the above-mentioned aliphatic polyester has a reduced viscosity (ηsp/C) of not less than 0.50 dl/g and not more than 2.50 dl/g. When the reduced viscosity is less than 0.50 dl/g, rupture frequently occurs during film forming, and the obtained film shows markedly degraded physical properties. When the reduced viscosity exceeds 2.50 dl/g, the obtained film shows poor hand tearability and twist retention, and has high melt viscosity, making melt extrusion difficult. The above-mentioned reduced viscosity is preferably not less than 0.50 dl/g and not more than 2.00 dl/g, more preferably not less than 0.50 dl/g and not more than 1.80 dl/g.

The above-mentioned aliphatic polyester can have a reduced viscosity within the above-mentioned range by controlling the average molecular weight and adjusting the molecular weight distribution, which are achieved by appropriately varying polymerization component, concentration of catalyst, polymerization temperature, polymerization time and the like depending on the kind (molecular structure) of the aliphatic polyester to be used.

The film of the present invention is preferably a biaxially oriented film to achieve improved mechanical property and improved heat shrinkability, and is preferably heat set after biaxial orientation, wherein the stretching and heat setting can be carried out according to known methods.

The film of the present invention can be formed by a known extrusion molding, e.g., T-die method, inflation method and the like, that afford a non-oriented film. The extrusion temperature is preferably set to one within the range of from melting temperature (Tm) of the polymer to be used to (Tm+70° C.), particularly from (Tm+20° C.) to (Tm+50° C.). When the extrusion temperature is too low, extrusion stability is hardly obtained and the extruder frequently suffers from overloading. When it is too high, the polymer unpreferably tends to decompose vigorously. The die of the extrusion machine to be used in the present invention can have circular or linear slits. The die temperature is about the same as the range of the extrusion temperature.

A non-oriented film can be biaxially oriented by sequential or simultaneous stretching of the first direction stretching and the second direction stretching. The stretching temperature is preferably in the range of from glass transition temperature (Tg) of the polymer to be used to (Tg+50° C.), particularly preferably from (Tg+10° C.) to (Tg+40° C.). When the stretching temperature is less than Tg, stretching may become difficult, whereas when it exceeds (Tg+50° C.), the uniformity in thickness and mechanical strength of the film may be unpreferably degraded.

The longitudinal and transverse stretching may be performed in a single stage or plural stages. In consideration of the uniformity in thickness and mechanical property of the film, the film is drawn ultimately not less than 2.0 times, preferably not less than 3.0 times, more preferably not less than 3.5 times, in the longitudinal direction, namely, machine direction (MD) of the film. In the width direction or transverse direction (TD) perpendicular to the longitudinal direction, the film is drawn not less than 3.0 times, preferably not less than 4.0 times, more preferably not less than 5.0 times, more preferably not less than 6.0 times. The film is stretched to achieve a longitudinal and transverse area ratio of not less than 6.00, preferably not less than 9.00, more preferably not less than 12.00. When the longitudinal draw ratio is less than 2.0, or the transverse draw ratio is less than 3.0, or the area ratio is less than 6.00, the resulting film may not have fine uniform thickness, mechanical strength and the like.

In the present invention, the refractive index (Nz) in the thickness direction and thermal shrinkage can be set to fall within a given range by stretching the film in the longitudinal direction at least once at a temperature of from (Tg+5° C.) to (Tg+40° C.), preferably from (Tg+20° C.) to (Tg+40° C.), at a stretching rate of not less than 10000%/min, preferably not less than 15000%/min, more preferably not less than 20000%/min.

The heat setting after stretching is important to make the thermal shrinkage fall within a given range. The heat setting is preferably performed at a temperature of from 145° C. to Tm, particularly from 150° C. to Tm, for about 1 sec to about 3 min. When the heat setting is performed at a temperature lower than 145° C., the obtained film shows greater thermal shrinkage, and when it is performed at a temperature higher than Tm, melting and breakage occur during heat setting.

After the heat setting, a heat relaxing treatment is applied as necessary to make the thermal shrinkage fall within a given range. The treatment temperature is from 125° C. to (Tm−20° C.) and the film is preferably relaxed in the width direction by 0.1% to 8.0%.

For a less thickness unevenness to be achieved, the transverse stretching should be performed at a high ratio. Consequently, the thermal shrinkage in the width direction tends to become higher. It is preferable, therefore, that the heat setting temperature be set near the melting point and the transverse relaxing treatment be performed while lowering the temperature from the heat setting temperature.

The thus-obtained aliphatic polyester film of the present invention has a varying thickness according to the object of use. The thickness is generally from 5 μm to 250 μm, preferably from 5 μm to 200 μm, more preferably from 10 μm to 150 μm.

The film of the present invention may contain known additives as necessary so long as the object of the present invention can be achieved. For example, slipping agent, lubricant, anti-blocking agent, thermal stabilizer, antioxidant, antistatic agent, light-resistance agent, impact resistance improver and the like can be added. The film of the present invention generally has a heat sealing layer formed thereon. Since this film needs to be transparent to show the content, the above-mentioned additives are added in an amount that achieves high transparency even after forming a heat sealing layer.

As the slipping agent, particles inert to the above-mentioned aliphatic polyester polymer can be used. For example, inorganic particles of metal oxide such as silica, titanium dioxide, talc, kaolinite and the like, metal salt such as calcium carbonate, calcium phosphate, barium sulfate and the like, organic polymer particles such as crosslinked polystyrene resin, crosslinked acrylic resin, silicone resin, crosslinked polyester resin and the like, and the like can be used. These may be used alone or in combination.

The above-mentioned inert particles preferably have an average particle size of not less than 0.01 μm and not more than 3.0 μm, particularly not less than 0.05 μm and not more than 2.5 μM, to simultaneously achieve transparency and slipperiness of the film. The amount of the inert particles is not less than 0.005 wt % and not more than 2 wt %, particularly preferably not less than 0.01 wt % and not more than 1.0 wt %.

For both the transparency and slipperiness to be achieved simultaneously, two or more kinds of inert particles are particularly preferably used in combination. Particularly, inert particles that deform during film forming (e.g., organic polymer particles that underwent low degree of crosslinking, such as crosslinked polystyrene, crosslinked acrylic and the like, inorganic particles such as silica which is an aggregate of primary particles and the like) and normal inert particles that do not deform during film forming are preferably combined.

The aliphatic polyester film of the present invention can be made into a laminate by a production process of coextrusion and/or coating. The film of the present invention can be subjected to corona treatment, plasma treatment, flame treatment and the like to improve surface energy.

The aliphatic polyester film of the present invention shows a thermal shrinkage in the longitudinal direction (i.e., MD) at 120° C. of not more than 5.0%, preferably not more than 3.0%. When the thermal shrinkage in the longitudinal direction is greater than 5.0%, the hand tearability is impaired. In addition, printing misalignment occurs in the printing process, and wrinkling occurs during heat sealing.

The thermal shrinkage in the width direction (TD, perpendicular to MD) at 120° C. is preferably not more than 5.0%, more preferably not more than 3.0%. When the thermal shrinkage in the width direction exceeds this range, the same problems may occur that are encountered when the thermal shrinkage in the longitudinal direction exceeds 5.0%.

The aliphatic polyester film of the present invention has a thickness unevenness in the longitudinal direction of preferably not more than 10.0%, more preferably not more than 8.0%, particularly preferably not more than 5.0%. When the thickness unevenness in the longitudinal direction is greater than 10.0%, the film comes to have inconsistent planarity in the longitudinal direction after heating in printing step, laminating process and the like that involve film-carrying tension, which in turn unpreferably causes a fall in the yield of the final product.

The aliphatic polyester film of the present invention preferably has a thickness unevenness in the width direction of not more than 10.0%, more preferably not more than 8.0%, particularly preferably not more than 5.0%. When the thickness unevenness in the width direction is greater than 10.0%, the film unwound from a roll during printing, laminating process and the like often develops snaking on a guide roll, thereby causing winding misalignment and wrinkling of the roll product after printing and laminating.

The aliphatic polyester film of the present invention preferably has a refractive index (Nz) in the thickness direction of not less than 1.4400 and not more than 1.4550, particularly preferably not less than 1.4450 and not more than 1.4550. When Nz is less than 1.4400, ruptures tend to occur during the process of film forming. When Nz exceeds 1.4550, the film comes to have inconsistent planarity upon heating for printing, laminating and the like.

The aliphatic polyester film of the present invention preferably has a value (Nx–Ny) obtained by subtracting the refractive index (Ny) in the width direction from the refractive index (Nx) in the longitudinal direction. The value is not less than –0.0200 and not more than 0.0000, more preferably not less than –0.0150 and not more than 0.0000. When Nx–Ny is less than –0.0200, the film is stretched by the action of film-carrying tension during heating of the film for printing, laminating and the like, thereby causing printing misalignment and ripples that degrade planarity. When Nx–Ny exceeds 0.0000, the film has too great a thickness unevenness.

As mentioned above, the aliphatic polyester film of the present invention has superior hand tearability and twist retention, and is extremely useful as a packaging film, an adhesive tape and the like for fresh food, processed food, pharmaceutical products, medical equipment, electronic parts and the like.

The present invention is explained in more detail in the following by referring to Examples and Comparative Examples. The present invention is not limited in any way by these examples. In the Examples and Comparative Examples, physical properties were evaluated by the following methods.

1. Reduced Viscosity ($\eta sp/C$)

Polymer (0.125 g) was dissolved in chloroform (25 ml) and measured by Ubbelohde's viscometer at 25° C.

2. Thermal Shrinkage

A film was cut into a size of width 10 mm and length 250 mm, wherein the long side (250 mm) was the direction along which thermal shrinkage was measured, and marked at 200 mm intervals. The distance (A) between the marks was measured while applying a constant tension of 5 g. The film was placed in an oven at 120° C. for 30 min without load, and taken out from the oven for measurement of the distance (B) between the marks, while applying a constant tension of 5 g. The thermal shrinkage was calculated by the following formula (I). In Examples 1–7 and Comparative Examples 1–7, only the thermal shrinkage in the longitudinal direction of the film was measured. In Examples 8–10 and Comparative Example 8, the thermal shrinkage was measured for both the longitudinal direction and the width direction.

$$\text{Thermal shrinkage } (\%)=[(A-B)/A]\times100 \qquad (I)$$

3. Thickness Unevenness

Using a film thickness continuous measuring apparatus manufactured by Anritsu Corp., film thickness was measured along the longitudinal direction of the film for 3 m, and the thickness unevenness was calculated. For the measurement of the thickness unevenness in the width direction, films having the longest possible length in the width direction were prepared and joined together with an adhesive tape into a single sample having a total length of not less than 3 m, which is the total of the width of the joined films. The thickness of the film for the entire 3 m length except the joint portions was successively measured and the thickness unevenness was calculated by the following formula (II).

$$\text{Thickness unevenness } (\%)=[(\text{maximum thickness}-\text{minimum thickness})/\text{average thickness}]\times100 \qquad (II)$$

4. Refractive Index (Nz, Nx, Ny) in the Thickness Direction, Longitudinal Direction and Width Direction Using an Abbe's Refractometer 1T manufactured by Atago Co., Ltd., the refractive index in each direction was measured.

5. Hand Tearability

A 15 mm wide sample tape was torn with hand and the tape that allowed easy cutting was shown with ◯, the tape that could not be cut with ease with hand was shown with X, and the tape evaluated in between ◯ and X was shown with γ.

6. Twist Retention

A 30 mm wide sample tape was twisted and the tape that did not restore the original shape with ease was shown with ◯, and the tape that could not maintain the twist was shown with X.

7. Processability

A printing ink layer was provided by gravure printing a gravure ink (Lamiace 61 white 2 liquid type manufactured by Toyo Ink Manufacturing Co., Ltd.) on each of aliphatic polyester films obtained in Examples and Comparative Examples. After 2 g/m$^2$ of an adhesive AD585/CAT-10 (manufactured by Toyo Morton) was applied thereon, 60 μm of a non-oriented polypropylene film (P1120 manufactured by Toyobo Co., Ltd.) was attached thereto by a dry laminate method so as to provide a sealant layer, thereby producing a layered product of the aliphatic polyester film. The film was monitored in these processes for wrinkling, printing misalignment and planarity, and evaluated according to the following three criteria.

◯: good quality (no wrinkling or printing misalignment, and fine planarity)

Δ: wrinkling and printing misalignment occurred somewhat but no practical problem X: planarity deterioration was observed with wrinkling and printing misalignment In Examples 8–10 and Comparative Example 8, the wound roll was examined and evaluated according to the following three criteria.

◯: fine winding state without snaking or wrinkling

Δ: snaking and wrinkling occurred somewhat but no practical problem

X: frequent snaking and wrinkling

EXAMPLES 1–5

Comparative Examples 1–3

Example 1

A polymer comprising poly-L-lactic acid (Tg: 60° C., TM: 170° C., 100 parts by weight) having a reduced viscosity of 0.85 dl/g and, as a slipping agent for forming surface projections, 0.06 part by weight of silica particle aggregate having an average particle size of 1.8 μm was extruded from an extrusion machine equipped with a T die and having a bore diameter of 30 mm at a resin temperature of 210° C., and cooled on a chilled roll at 20° C. to give a 258 μm thick non-oriented film. Plural ceramic rolls were used to pre-heat the film to a temperature of 80° C. and the film was stretched 3.5 times between rolls in the longitudinal direction at a stretching rate of 28000%/min. Then, the film was stretched 3.8 times in the transverse direction at 80° C. using a tenter-type stretching machine. The film was subjected to heat setting at 155° C. and 3.0% transverse relaxing treatment at 135° C. to give a 20 μm thick oriented film.

Example 2

In the same manner as in Example 1 except that the reduced viscosity of poly-L-lactic acid (Tg: 60° C., Tm: 170° C.) was set to 1.50 dl/g, an oriented film was obtained.

Example 3

In the same manner as in Example 1 except that the reduced viscosity of poly-L-lactic acid (Tg: 60° C., Tm: 170° C.) was set to 2.10 dl/g, an oriented film was obtained.

Example 4

In the same manner as in Example 1 except that the reduced viscosity of poly-L-lactic acid (Tg: 60° C., Tm: 170° C.) was set to 2.40 dl/g, an oriented film was obtained.

Example 5

In the same manner as in Example 2 except that the heat setting temperature was set to 150° C., an oriented film was obtained.

Comparative Example 1

In the same manner as in Example 1 except that the reduced viscosity of poly-L-lactic acid (Tg: 60° C., Tm: 170° C.) was set to 2.82 dl/g, an oriented film was obtained.

Comparative Example 2

In the same manner as in Example 1 except that the reduced viscosity of poly-L-lactic acid (Tg: 60° C., Tm: 170° C.) was set to 0.43 dl/g, an oriented film was obtained.

Comparative Example 3

In the same manner as in Example 2 except that the heat setting temperature was set to 130° C., an oriented film was obtained.

The oriented films obtained in Examples 1–5 and Comparative Examples 1–3 were evaluated for thermal shrinkage in the longitudinal direction, film formation, hand tearability and twist retention. The results are shown in Table 1. The reduced viscosity of the poly-L-lactic acid used is also shown in Table 1.

film formation, hand tearability and twist retention. In contrast, the oriented film obtained in Comparative Example 1, wherein poly-L-lactic acid having a reduced viscosity exceeding 2.50 dl/g was used, was inferior in hand tearability and twist retention and suffered from difficulty in extrusion during film forming. The oriented film obtained in Comparative Example 2, wherein poly-L-lactic acid having a reduced viscosity of less than 0.50 dl/g was used, suffered from frequent film rupture during film forming. The oriented film obtained in Comparative Example 3, wherein the thermal shrinkage of the film in the longitudinal direction at 120° C. exceeded 5.0%, was poor in hand tearability.

EXAMPLES 6 and 7

Comparative Examples 4–7

Example 6

A polymer comprising poly-L-lactic acid (Tg: 60° C., Tm: 170° C., 100 parts by weight) having a reduced viscosity of 1.55 dl/g and, as a slipping agent for forming surface projections, 0.06 part by weight of silica particle aggregate having an average particle size of 1.8 μm was extruded from an extrusion machine equipped with a T die and having a bore diameter of 30 mm at a resin temperature of 200° C., and cooled on a chilled roll at 20° C. to give a 300 μm thick non-oriented film. Plural ceramic rolls were used to pre-heat the film to a temperature of 90° C. and the film was stretched 1.5 times between rolls in the longitudinal direction at a stretching rate of 30000%/min and then 2.7 times at 93° C. Thereafter, the film was stretched 3.8 times in the transverse direction at 80° C. using a tenter-type stretching machine. The film was subjected to heat setting at 155° C. for 1 min and 3.0% transverse relaxing treatment at 135° C. to give a 20 μm thick oriented film.

Example 7

In the same manner as in Example 6 except that the heat setting was performed at 150° C., an oriented film was obtained.

TABLE 1

|  | Ex. 1 | Ex. 2 | Ex. 3 | Ex. 4 | Ex. 5 | Comp. Ex. 1 | Comp. Ex. 2 | Comp. Ex. 3 |
| --- | --- | --- | --- | --- | --- | --- | --- | --- |
| reduced viscosity (dl/g) | 0.85 | 1.50 | 2.10 | 2.40 | 1.50 | 2.82 | 0.43 | 1.50 |
| thermal shrinkage (%) in longitudinal direction | 2.3 | 2.4 | 2.5 | 2.8 | 4.5 | 4.7 | 2.0 | 10.0 |
| film formation | Good | Good | Good | Good | Good | Difficult extrusion | Many ruptures | Good |
| hand tearability | ○ | ○ | Δ | Δ | Δ | x | ○ | x |
| twist retention | ○ | ○ | ○ | ○ | ○ | x | ○ | ○ |

From Table 1, it is evident that the oriented films obtained in Examples 1–5, wherein poly-L-lactic acid having a reduced viscosity of from 0.50 dl/g to 2.50 dl/g was used, had a thermal shrinkage in the longitudinal direction of the film at 120° C. of not more than 5.0%, and were superior in Comparative Examples 4 and 5

In the same manner as in Example 6 except that poly-L-lactic acid having a reduced viscosity of 2.84 dl/g (Tg: 60° C., Tm: 170° C., Comparative Example 4) and poly-L-lactic acid having a reduced viscosity of 0.45 dl/g (Tg: 60° C., Tm:

170° C., Comparative Example 5) were used instead of poly-L-lactic acid having a reduced viscosity of 1.55 dl/g, an oriented film was obtained. The reduced viscosity was adjusted by changing the polymerization rate and polymerization time.

Comparative Example 6

In the same manner as in Example 6 except that longitudinal stretching comprised preheating the film to 63° C. using plural ceramic rolls and stretching the film 3.5 times between rolls in the longitudinal direction in one step at a stretching rate of 30000%/min, an oriented film was obtained.

Comparative Example 7

In the same manner as in Example 6 except that the heat setting was performed at 140° C., an oriented film was obtained.

The oriented films obtained in Examples 6 and 7, and Comparative Examples 4–7 were evaluated for thickness unevenness in the longitudinal direction, Nz, thermal shrinkage in the longitudinal direction, Nx–Ny, film formation, hand tearability, twist retention and processability (wrinkling and printing misalignment). The results are shown in Table 2. The reduced viscosity of the poly-L-lactic acid used is also shown in Table 2.

The oriented film obtained in Comparative Example 5, wherein poly-L-lactic acid having a reduced viscosity of less than 0.50 dl/g was used, was inferior in processability and suffered from frequent film rupture during film forming. The oriented film obtained in Comparative Example 6, wherein the thermal shrinkage of the film in the longitudinal direction exceeded 5.0%, the thickness unevenness in the longitudinal direction exceeded 10.0% and Nz was outside the preferable range of the present invention, was inferior in processability and suffered from film rupture during film forming. The oriented film obtained in Comparative Example 7, wherein the thermal shrinkage of the film in the longitudinal direction exceeded 5.0%, was inferior in hand tearability and processability.

EXAMPLES 8–10

Comparative Example 8

Example 8

A polymer comprising poly-L-lactic acid (Tg: 60° C., Tm: 170° C., 100 parts by weight) having a reduced viscosity of 1.73 dl/g and, as a slipping agent for forming surface projections, 0.06 part by weight of silica particle aggregate having an average particle size of 2.5 μm was extruded from an extrusion machine equipped with a T die and having a bore diameter of 30 mm at a resin temperature of 210° C.,

TABLE 2

|  | Example 6 | Example 7 | Comp. Ex. 4 | Comp. Ex. 5 | Comp. Ex. 6 | Comp. Ex. 7 |
| --- | --- | --- | --- | --- | --- | --- |
| reduced viscosity (dl/g) | 1.55 | 1.55 | 2.84 | 0.45 | 1.55 | 1.55 |
| thickness unevenness (%) in longitudinal direction | 2.1 | 2.3 | 8.0 | 6.8 | 13.1 | 2.1 |
| Nz | 1.4459 | 1.4466 | 1.4426 | 1.4548 | 1.4391 | 1.4476 |
| thermal shrinkage (%) in longitudinal direction | 2.1 | 4.6 | 4.3 | 2.0 | 5.3 | 9.9 |
| Nx–Ny | −0.0131 | −0.0138 | −0.0156 | −0.0153 | −0.0035 | −0.0140 |
| film formation | Good | Good | Difficult extrusion | Many ruptures | Rupture occurred | Good |
| hand tearability | ○ | Δ | x | ○ | Δ | x |
| twist retention | ○ | ○ | x | ○ | ○ | ○ |
| Processability |  |  |  |  |  |  |
| wrinkles | ○ | Δ | Δ | x | x | x |
| printing misalignment | ○ | Δ | Δ | Δ | x | x |

From Table 2, it is evident that the oriented films obtained in Examples 6 and 7, wherein poly-L-lactic acid having a reduced viscosity of from 0.50 dl/g to 2.50 dl/g was used, had a thermal shrinkage in the longitudinal direction of the film at 120° C. of not more than 5.0% and the thickness unevenness in the longitudinal direction of not more than 10.0%, and were superior in film formation, hand tearability, twist retention and processability. In contrast, the oriented film obtained in Comparative Example 4, wherein poly-L-lactic acid having a reduced viscosity exceeding 2.50 dl/g was used, was inferior in hand tearability and twist retention and suffered from difficulty in extrusion during film forming.

and cooled on a chilled roll at 20° C. to give a 380 μm thick non-oriented film. Plural ceramic rolls were used to pre-heat the film to a temperature of 70° C. and the film was stretched 3.0 times between rolls in the longitudinal direction at a stretching rate of 30000%/min. Then, the film was stretched 6.5 times in the transverse direction while elevating the temperature from 68° C. to 80° C. using a tenter-type stretching machine. The film was subjected to heat setting at 155° C. for 15 sec and 3.0% transverse relaxing treatment while lowering the temperature from 155° C. to 120° C. to give a 20 μm thick biaxially oriented film made from poly-L-lactic acid.

Example 9

In the same manner as in Example 8 except that the longitudinal draw ratio was set to 2.0, transverse draw ratio was set to 4.0, and the final film thickness was adjusted to 20 μm by changing the thickness of the non-oriented film, a biaxially oriented film made from poly-L-lactic acid was obtained.

Example 10

In the same manner as in Example 8 except that the heat setting was performed at 150° C. and the 3.0% transverse relaxing treatment was performed while lowering the temperature from 150° C. to 120° C., a biaxially oriented film made from poly-L-lactic acid was obtained.

Comparative Example 8

In the same manner as in Example 8 except that the heat setting at 140° C. and the 3.0% transverse relaxing treatment were performed at the same time, an oriented film was obtained.

The oriented films obtained in Examples 8 to 10, and Comparative Example 8 were evaluated for thickness unevenness in the longitudinal and width directions, Nz, thermal shrinkage in the longitudinal and width directions, Nx–Ny,. film formation, hand tearability, twist retention and processability of the film and roll. The results are shown in Table 3. The reduced viscosity of the poly-L-lactic acid used is also shown in Table 3.

TABLE 3

| | | Example 8 | Example 9 | Example 10 | Comp. Ex. 8 |
|---|---|---|---|---|---|
| reduced viscosity (dl/g) | | 1.73 | 1.73 | 1.73 | 1.73 |
| thickness unevenness (%) | longitudinal direction | 3.8 | 7.8 | 3.6 | 3.4 |
| | width direction | 4.5 | 9.1 | 4.4 | 4.1 |
| NZ | | 1.4462 | 1.4511 | 1.4444 | 1.4521 |
| thermal shrinkage (%) | longitudinal direction | 2.3 | 1.9 | 4.8 | 9.8 |
| | width direction | 0.8 | 0.2 | 0.9 | 9.1 |
| Nx-Ny | | −0.0163 | −0.0132 | −0.0151 | −0.0136 |
| film formation | | Good | Good | Good | Good |
| hand tearability | | ○ | ○ | ○ | x |
| twist retention | | ○ | ○ | ○ | ○ |
| process-ability | film | ○ | Δ | Δ | x |
| | roll | ○ | Δ | Δ | x |

From Table 3, it is evident that the oriented films obtained in Examples 8–10, wherein poly-L-lactic acid having a reduced viscosity of from 0.50 dl/g to 2.50 dl/g was used, had a thermal shrinkage in the longitudinal direction and the width direction of the film at 120° C. of not more than 5.0% for both directions and the thickness unevenness in the longitudinal direction and the width direction of not more than 10.0% for both directions, and were superior in film formation, hand tearability, twist retention and processability. In contrast, the oriented film obtained in Comparative Example 8 had a thermal shrinkage in the longitudinal direction and the width direction of more than 5.0% for both directions, and was poor in processability.

As is evident from the foregoing description, the aliphatic polyester film of the present invention is superior in the critical properties (e.g., hand tearability and twist retention) of a packaging film for fresh food, processed food, pharmaceutical products, medical equipment, electronic parts and the like. Moreover, the inventive film is barely associated with printing misalignment during printing, wrinkling during heat sealing or snaking during running, thereby demonstrating the excellent processability and film forming property. Hence, the film is extremely useful as a packaging film and an adhesive tape. In addition, since the aliphatic polyester oriented film is biodegradable when placed in a natural environment, it is safe for the natural environment.

This application is based on application Nos. 083374/1999 and 087018/1999 filed in Japan, the contents of which are incorporated hereinto by reference.

What is claimed is:

1. An aliphatic polyester film comprising, as a main component, a polylactic acid having a reduced viscosity ($\eta sp/C$) of not less than 0.50 dl/g and not more than 2.50 dl/g, wherein the film has a thermal shrinkage in the longitudinal direction at 120° C. of not more than 5.0%.

2. The aliphatic polyester film of claim 1, wherein the film has a thickness unevenness in the longitudinal direction of not more than 10.0%.

3. The aliphatic polyester film of claim 2, wherein the film has a thickness unevenness in the longitudinal direction of not more than 5.0%.

4. The aliphatic polyester film of claim 3, wherein the film has a thickness unevenness in the width direction of not more than 5.0%.

5. The aliphatic polyester film of claim 2, wherein the film has a thickness unevenness in the width direction of not more than 10.0%.

6. The aliphatic polyester film of claim 5, wherein the film has a thickness unevenness in the width direction of not more than 5.0%.

7. The aliphatic polyester film of claim 5, wherein the film has a thermal shrinkage in the width direction at 120° C. of not more than 5.0%.

8. The aliphatic polyester film of claim 7, wherein the film has a thermal shrinkage in the width direction at 120° C. of not more than 3.0%.

9. The aliphatic polyester film of claim 1, wherein the film has a thermal shrinkage in the longitudinal direction at 120° C. of not more than 3.0%.

10. The aliphatic polyester film of claim 9, wherein the film has a thermal shrinkage in the width direction at 120° C. of not more than 3.0%.

11. The aliphatic polyester film of claim 1, wherein the aliphatic polyester has a reduced viscosity of not less than 0.50 dl/g and not more than 2.00 dl/g.

12. The aliphatic polyester film of claim 1, wherein the aliphatic polyester has a reduced viscosity of not less than 0.50 dl/g and not more than 1.80 dl/g.

13. The aliphatic polyester film of claim 1, wherein the film has a refractive index (Nz) in the thickness direction of not less than 1.4400 and not more than 1.4550.

14. The aliphatic polyester film of claim 1, wherein the film shows a difference value (Nx−Ny) between the refractive index (Nx) in the longitudinal direction and the refractive index (Ny) in the width direction of not less than −0.0200 and not more than 0.0000.

15. The aliphatic polyester film of claim 1, wherein the film is a biaxially oriented film.

16. The aliphatic polyester film of claim 1, which was subjected to biaxial orientation and heat setting.

* * * * *